2(C) means 4 for measuring temperature doubles as a heater. That is to say, an alternating current flows through and heats a thermo-couple and its wire. And the change of temperature of the thermo-couple is measured by the thermo-couple. After that, the coefficient of thermal conductivity of a sample is calculated using the equation (8).

FIG. 2(G) shows another embodiment of a probe according to the present invention. In FIG. 2(G), a heater 1 has a pair of lead wires 35 spaced a predetermined length apart on said heater 1 for measuring the voltage drop in said heater 1. The heater 1 is made of, for instance, platinum wire. When a current flows through said heater 1, the electric resistance of said heater 1 changes due to its temperature change and, thus, the resistance and the temperature of the heater 1 can be obtained by measuring the current in said heater 1 and the voltage drop between said pair of leads 35. After that, the coefficient of thermal conductivity of the sample is calculated using the equation (8). The feature of FIG. 2(G) is that the heater doubles as means for measuring the temperature, and the thermo-couple is removed.

In FIGS. 2(A) – 2(C) and 2(G), a probe which does not have a block 5 is possible. In that case, reference material whose coefficient of thermal conductivity is known can be provided as an attachment each time measurement is performed and thus, the most suitable reference material can be selected for each sample. FIGS. 2(D), 2(E), 2(F) and 2(H) show four embodiments which do not have a block 5. In these embodiments, both a heater 1 and means 4 for measuring temperature are mounted on a support means 21 which is a thin plane with an extremely small coefficient of thermal conductivity. Many modifications of the support means 21 will occur to those skilled in the art. For example, a string or spring means instead of the plane support means can support the heater 1 and means 4. The embodiment of FIG. 2(D) corresponds to that of FIG. 2(A), in which a junction 20 is directly attached to a heater 1. The embodiment of FIG. 2(E) corresponds to that of FIG. 2(B), in which a junction 20 is positioned near a heater 1, the embodiment of FIG. 2(F) corresponds to that of FIG. 2(C), in which a junction 20 and its wire double as a heater, and the embodiment of FIG. 2(H) corresponds to that of FIG. 2(G), in which a heater doubles as means for measuring temperature. In the embodiments of FIGS. 2(D), 2(E), 2(F) and 2(H), a heater and/or a thermo-couple are surrounded by reference material and a sample in the actual measuring operation.

The shape of the heater 1 in FIGS. 2(A) – 2(H) is preferably band shape with a rectangular cross section instead of a circular cross section. Thus, the contact condition of the probe with a sample is improved, and an accurate result is obtained from equations (8) or (9). A band type heater, for instance, of 1 mm width, 70 μm thickness and 150 mm long made of nichrome or platinum is preferable.

FIG. 3 shows one embodiment of a whole view of a probe including one of the structures in FIGS. 2(A) – FIG. 2(C) and FIG. 2(G). In FIG. 3, reference material 5, a heater 1 and a thermo-couple 4 are covered with cover means 7, to which a stick 6 is connected. At the end of the stick 6, a plug 8 to which a heater 1 and a couple 4 are electrically connected is attached.

FIG. 4 shows a block diagram of an electrical circuit for the probe of FIGS. 2(A), 2(B), 2(D) and 2(E). In FIG. 4 a probe having reference material 5, whose coefficient of thermal conductivity is $\lambda_1$, a heater 1 and a thermo-couple 4 covered with cover means 7, is put on a sample 15 so as to place said heater 1 and couple 4 between said reference material 5 and the sample 15. The heater 1 is energized by a regulated constant current source 11. The current through the heater is measured by a DC ammeter 10 and the voltage between two terminals of the heater is measured by a DC voltmeter 9. The power applied to the heater 1, or the calories $q$ in equation (8) generated by the heater 1 per unit length in a unit of time can be calculated from the readings of said meters 9 and 10. The data concerning the temperature of the heater 1 is picked up by a CA thermo-electric couple 4, whose output voltage is applied to a pen-recorder type voltmeter 14 through a cold junction 12 and a reference voltage generator 13. The generator 13 operates so as to subtract a predetermined value from the output voltage of said CA couple 4 and, thus, only the deviation of the output voltage of said couple 4 is applied to the recorder 14. It should be easily understood that the coefficient of thermal conductivity $\lambda_2$ of the sample 15 can be calculated from the equation (8) by substituting the relationship between the temperature $T_1$, $T_2$ and time $t_1$, $t_2$.

FIG. 5 shows another block diagram of an electrical circuit, which can be used with a probe of FIG. 2(C) or FIG. 2(F). In FIG. 5, a thermo-electric couple 4 is put between reference material 5 whose coefficient of thermal conductivity is $\lambda_1$ and a sample 15 whose coefficient of thermal conductivity is unknown. The thermo-electric couple 4 and its related wire are heated by alternating current from an alternating source 30 through a capacitor 31. A commercial source with 50 or 60 Hz can be used as the alternating source 30. The power applied to the heater or couple 4 is calculated from the readings of an alternating current ammeter 32 and an alternating current voltmeter 33 and, thus, the calories generated by the heater or couple 4 is calculated. The value of the DC thermo-electro motive force generated by said heater or couple 4 is applied to a pen-recorder type DC voltmeter 14 through a low pass filter (LPF) 34, a cold junction compensator 12 and a reference voltage 13. Said recorder 14 provides, of course, the reading of the deviation of temperature at the couple 4. Said low pass filter (LPF) 34 prevents the alternating current from flowing to the DC recorder 14.

FIG. 11 shows another block diagram of an electrical circuit, which can be used with the probe of FIG. 2(G) or FIG. 2(H). In FIG. 11, only a heater 1 is placed between reference material 5 whose coefficient of thermal conductivity is known and a sample 15 whose coefficient of thermal conductivity is unknown. The heater 1 is heated by an electrical current from a source 36. The power applied to the heater 1 is calculated from the readings of an ammeter 10 and a voltmeter 9, and the amount of calories generated by the heater 1 is calculated from said power. A value $R$ of resistance of the heater 1 at temperature $T$ relates to the temperature of the heater itself and is shown as follows.

$$R = R_o (1 + \beta T)$$

where $R_o$ and $\beta$ are constants, $T$ is the temperature of the heater 1, and $R$ is the ratio of the current flowing in the heater 1 and the voltage drop between a pair of leads 35, which is read from a pen-recorder type voltmeter 14 through a reference voltage generator 13. It

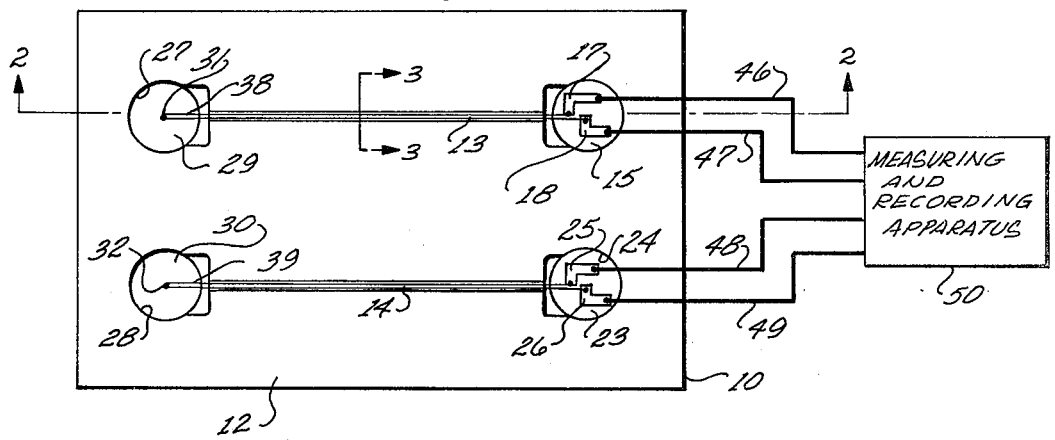
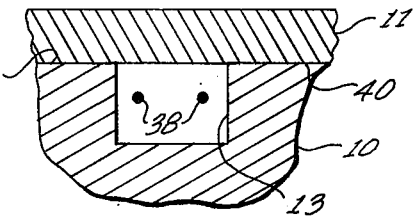
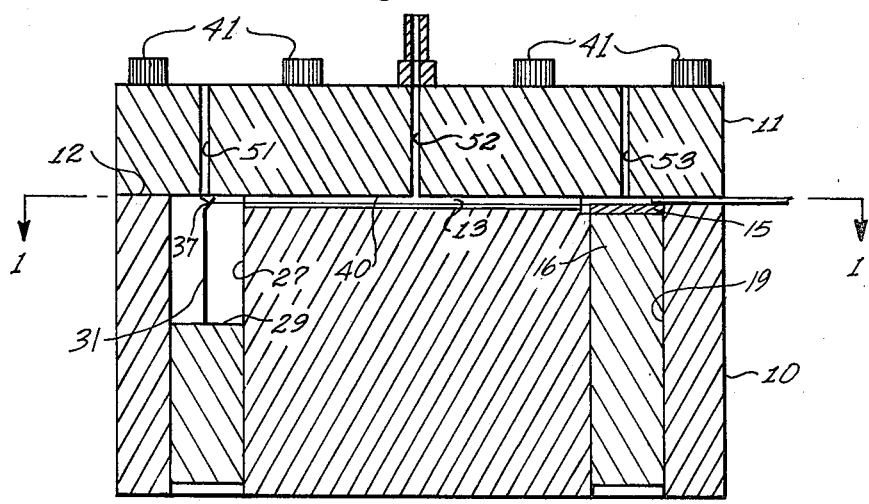

FLUID MEASURING APPARATUS

BACKGROUND OF THE INVENTION

This invention relates to sensitive, fast responding fluid measuring apparatus and, more particularly, to an improved hot wire anemometer.

There are two common types of temperature sensors employed in anemometers and chromatography to measure gas characteristics. One type is a thermistor bead having a negative temperature coefficient of resistance. Although high sensitivity can be achieved with a thermistor bead, its response to changes in the gas characteristics is slow due to the relatively large mass of the bead. The other type is an elongated thin electrically conductive wire, called a hot wire, which has a positive temperature coefficient of resistance. Although a hot wire responds quickly to changes in the gas characteristics, it does not generally permit as high a sensitivity as a thermistor bead.

In a hot wire anemometer, the hot wire is connected to serve as one branch of an electrical bridge circuit. Current passing through the hot wire heats the wire, thereby increasing its resistance. The hot wire is disposed in an elongated cavity through which the gas to be measured flows and cools the hot wire accordingly. If the type of gas passing through the cavity is known, the resistance change of the hot wire is a measure of the gas flow rate. If the flow rate of the gas passing through the cavity is unknown, the resistance change of the hot wire is a measure of the thermal conductivity of the gas and, hence, the gas type.

The longer the hot wire for a given volume of the hot wire cavity or the smaller the volume of the hot wire cavity for a given hot wire length, the greater is the cooling effect per unit of gas flow through the cavity. Therefore, to achieve high sensitivity, the objective is to provide a large ratio of hot wire length to cavity volume. The factors limiting this objective are the restrictions on the overall size of the apparatus, the ability to bore a long, straight cavity having a small cross section in a piece of material, and support for the hot wire so it remains out of contact with the sides of the cavity.

SUMMARY OF THE INVENTION

According to one aspect of the invention, a hot wire is bent in half to extend along the length of an elongated cavity enclosed on its sides. The ends of the wire are supported at one end of the cavity, and the middle of the wire is supported at the other end of the cavity to maintain the two halves of the wire in spaced approximately parallel relationship from each other, and in spaced relationship from the sides of the cavity. Thus, for a cavity having a given length, the length of the hot wire can be doubled and corresponding increase in sensitivity can be achieved.

According to another aspect of the invention, the hot wire cavity is formed in a housing that comprises a block of material of high heat conductivity having a first surface and a plate of the material having a matching second surface removably attached in abutment with the first surface. The cavity is a groove formed in the first surface that has an open side enclosed by the second surface. It is possible to machine on a surface of the material a groove that is longer and smaller in cross section than a hole having no open sides bored into the material. Thus, higher sensitivity can be achieved.

In the preferred embodiment, the ends of the hot wire are anchored to a printed circuit board fitted in a recess at the end of the hot wire cavity. The middle of the wire is wrapped around the free end of a quartz rod disposed in a chamber at the other end of the hot wire cavity. The rod is deformed to exert tension upon the hot wire and thus absorb its thermal expansion.

BRIEF DESCRIPTION OF THE DRAWING

The features of a specific embodiment of the best mode contemplated of carrying out the invention are illustrated in the drawing, in which:

FIG. 1 is a top sectional view of fluid measuring apparatus incorporating the principles of the invention;

FIG. 2 is a front sectional view of the apparatus of FIG. 1; and

FIG. 3 is a side sectional view of a portion of the apparatus of FIG. 1 illustrating one of the hot wire cavities.

DETAILED DESCRIPTION OF THE SPECIFIC EMBODIMENT

In the drawing, a block 10 and a plate 11 comprise a housing for fluid measuring apparatus. Block 10 and plate 11 are made of a material having high thermal conductivity, such as aluminum or steel to make the apparatus thermally stable. Block 10 has a surface 12 in which straight elongated grooves 13 and 14 each having an open side are formed by machining. A circular printed circuit board 15 is secured to the end of a cylindrical plug 16 that fits in an elongated cylindrical chamber 19 lying on an axis transverse to groove 13. Mutually isolated, electrically conductive L-shaped pads 17 and 18 are formed on the surface of circuit board 15. As illustrated in FIG. 1, pads 17 and 18 each have an arm parallel to the length of groove 13 and an arm perpendicular to the length of groove 13. The perpendicular arms of pads 17 and 18 are longitudinally offset from each other, aligned with groove 13, and spaced apart a distance slightly less than the width of groove 13. A circular printed circuit board 23 is secured to the end of a cylindrical plug like plug 16 in an elongated cylindrical chamber like chamber 19 lying on an axis transverse to groove 14. Mutually isolated, electrically conductive L-shaped pads 25 and 26 are formed on the surface of circuit board 23. Pads 25 and 26 each have an arm parallel to the length of groove 14 and an arm perpendicular to the length of groove 14. The perpendicular arms of pads 25 and 26 are longitudinally offset from each other, aligned with groove 14, and spaced apart a distance slightly less than the width of groove 14.

An elongated cylindrical chamber 27 is formed at the other end of groove 13 and an elongated cylindrical chamber 28 is formed at the other end of groove 14. Chambers 27 and 28 lie along axes that are transverse to the length of grooves 13 and 14. Cylindrical plugs 29 and 30 fit in chambers 27 and 28. One end of a quartz rod 31 in chamber 27 is anchored to plug 29 so the other, free end of rod 31 is aligned with groove 13. One end of a quartz rod 32 in chamber 28 is anchored to plug 30, so the other, free end of rod 32 is aligned with groove 14.

A thin elongated i.e., uncoiled electrically conductive hot wire 38 is bent in half to extend along the length of groove 13. This permits the length of the hot wire to be doubled without increasing the volume of the hot wire cavity, thereby improving sensitivity accordingly. Since block 10 and plate 11 are made of a good thermal conductor and good thermal conductors are also good electrical conductors, it is necessary to avoid short circuits that the two halves of wire 38 be precisely positioned in groove 13 without contacting each other or the sides of groove 13. The center of hot wire 38 is wrapped around the end of rod 31 and the ends of hot wire 38 are soldered to pads 17 and 18, respectively, such that the two halves of wire 38 are in spaced, approximately parallel relationship from each other and in spaced relationship from the sides of groove 13, as depicted in FIG. 3. The solder connection of the ends of hot wire 38 to pads 17 and 18, respectively, rigidly supports the ends of hot wire 38. Thus, the ends of hot wire 38 are held in fixed relationship longitudinally and laterally with respect to each other and electrically isolated from each other by circuit board 15, including pads 17 and 18 and the solder connections. The free end of rod 31 has a hook 37 (FIG. 2) that prevents the middle of hot wire 38 from slipping off rod 31, and maintains wire 38 in spaced relationship from the bottom of groove 13. Hook 37 permits longitudinal movement of the middle of hot wire 38, i.e., movement parallel to its longitudinal axis, and prevents lateral movement of the middle of hot wire 38, i.e., movement perpendicular to its longitudinal axis. The free end of rod 31 is deformed toward groove 13 sufficiently so hot wire 38 remains in tension over the full range of anticipated thermal expansion. As illustrated in the drawing, hot wires 38 and 39 and grooves 13 and 14 are horizontally oriented. It should be noted there is no problem of the horizontally oriented hot wires sagging, because the hot wires are held in tension by the rods around which their respective centers are wrapped. Thus, rod 31 absorbs all the thermal expansion of wire 38, which insures that the two halves of hot wire 38 do not sag when they expand, thereby contacting each other or the sides of groove 13 and causing a short circuit. Although the lateral position of the middle of hot wire 38 remains fixed, the two halves of hot wire 38 are free to move longitudinally to equalize the tension therebetween during thermal expansion. To place wire 38 in tension, the ends of hot wire 38 could be pulled, to the right as viewed in FIG. 1, thereby bending the free end of rod 31 toward groove 13, while soldering the two halves of wire 38 to pads 17 and 18; thereafter, the ends of hot wire 38 extending beyond pads 17 and 18 could be trimmed.

Plugs 16 and 29 can be rotated and translated in chambers 19 and 27, respectively, to make minor adjustments in the alignment of hot wire 38 in groove 13. Hook 37 is displaced from the center axis of plug 29. Thus, when plug 29 is rotated, the middle of hot wire 38 moves laterally relative to the sides of groove 13. When plug 16 is rotated, pads 17 and 18 also rotate to move the ends of hot wire 38 laterally relative to the sides of groove 13. When plugs 16 and 28 are translated, hot wire 38 moves laterally relative to the bottom of groove 13. After the adjustment is complete, set screws, not shown, are tightened to prevent further movement of plugs 16 and 29.

A thin elongated electrically conductive hot wire 39 is bent in half to extend along the length of groove 14. The center of hot wire 39 is wrapped around the end of rod 32, and the ends of hot wire 39 are soldered to pads 25 and 26, respectively, such that the two halves of wire 39 are in spaced approximately parallel relationship from each other and in spaced relationship from the sides of groove 14. The free end of rod 32 is deformed toward groove 14 sufficiently so hot wire 39 remains in tension over the full range of anticipated thermal expansion.

At one end electrically conductive leads 46, 47, 48, and 49, which would in general be much thicker than hot wires 38 and 39, are soldered to pads 17, 18, 25, and 26, respectively. At the other end, leads 46, 47, 48, and 49 are connected to measuring and recording apparatus 50. By way of example, apparatus 50 could comprise the bridge circuit shown in FIG. 2 of my U.S. Pat. No. 3,735,752, which issued May 29, 1973. The disclosure of this patent is incorporated herein by reference. In any case, apparatus 50 includes an electrical power source that serves to heat hot wires 38 and 39.

Plate 11 has a surface 40 that matches surface 12 of block 10. Surface 40 is held in abutment with surface 12 by screws 41, which pass through bores in plate 11 to engage threaded bores in block 10. Surface 40 covers the open sides of grooves 13 and 14, respectively, to form hot wire cavities enclosed on their sides. This construction permits higher sensitivity because a longer and narrower hot wire cavity can be formed by machining a groove along the surface of a piece of material than by boring a hole into the middle of the material. Further, a big advantage of this construction is ease of accessibility to the hot wire cavity to replace or reposition the hot wire in the event of a short circuit. Although surfaces 12 and 40 are preferably flat, to minimize the volume of the hot wire cavities and eliminate the need for hot wire guides in addition to the quartz rods, they could be curved if circumstances dictate. The hot wire cavities could also have a bend or curve if circumstances dictate.

Conduits 51, 52, and 53 in plate 11 couple chamber 27, the center of groove 13, and recess 16, respectively, to the exterior of the housing of the apparatus.

If the apparatus is employed as a spirometer to measure the flow rate of a patient's breath, conduit 52 could be connected to the throat of a venturi tube through which the patient's breath flows. With specific reference to FIG. 3 of my U.S. Pat. No. 3,735,752, conduit 52 could be connected to passage 80 therein. In this case, no conduits connect chamber 28, groove 14, or recess 24 to the exterior of the housing. Hot wire 38 serves to compensate for ambient temperature changes.

If the apparatus is employed in the field of chromatography, conduits analogous to conduits 51, 52, and 53 would couple chamber 28, groove 14, and recess 24 to the exterior of the housing. A gas to be detected would be applied to conduit 51 and flow therefrom through groove 13 to conduits 50 and 52 from which the gas would escape to the atmosphere. A known gas, which serves as a reference, would be supplied to the conduit coupled to the center of groove 14 and flow through groove 14 to the conduits coupled to chamber 28 and recess 24, respectively, from which the reference gas would escape to the atmosphere.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the hot wire could be doubled back on itself a plurality of times to further increase the wire length to cavity volume ratio. This device can also be used as an air gage to measure small displacements.

What is claimed is:
1. Fluid measuring apparatus comprising:
   a housing having an elongated cavity enclosed on its sides and open at its ends;
   a thin elongated, i.e., uncoiled, hot wire bent in half to extend along the length of the cavity;
   first means at one end of the cavity for supporting the ends of the wire in fixed relationship longitudinally and laterally with respect to each other and electrically isolated from each other;
   second means at the other end of the cavity for supporting the middle of the wire, the second wire supporting means comprising a deformed spring that exerts tension on the middle of the hot wire to keep the hot wire taut as its length changes, permits longitudinal movement of the middle of the wire, and prevents lateral movement of the middle of the wire, the first and second supporting means cooperating to maintain the halves of the wire in spaced approximately parallel relationship from each other and in spaced relationship from the sides of the cavity;
   means for forming in the housing a fluid entrance to the cavity;
   means for forming in the housing a fluid exit from the cavity longitudinally spaced from the entrance; and
   means for measuring the change in resistance of the hot wire.

2. The apparatus of claim 1, in which the housing comprises a block of material having a first flat surface, a plate having a second flat surface adapted to abut the first surface, and means for attaching the plate to the block, and the cavity comprises a groove formed in the first surface of the block, the groove having an open side which is enclosed by the second surface of the plate.

3. The apparatus of claim 1, in which the first wire supporting means comprises a printed circuit board, first and second mutually isolated conductive pads lying entirely on the circuit board, solder connections between the ends of the hot wire and the first and second pads, respectively, and a pair of electrical leads interconnected between the pads, respectively, and the measuring means.

4. The apparatus of claim 3, in which the electrical leads are substantially thicker than the hot wire and the pads are L-shaped, each pad having a first arm parallel to the length of the hot wire and a second arm perpendicular to the length of the hot wire, the second arms of the pads being longitudinally offset from each other and spaced apart approximately the spacing between the two halves of the wire.

5. The apparatus of claim 4, in which the second wire supporting means comprises a deformed rod around which the middle of the wire is wrapped, the deformed rod exerting tension on the hot wire to keep the hot wire taut as its length changes.

6. The apparatus of claim 3, in which an elongated chamber is formed in the housing transverse to the length of the cavity at the one end of the cavity, a rotatable and translatable plug is disposed in the chamber, and the printed circuit board is attached to the plug.

7. The apparatus of claim 6, in which an elongated second chamber is formed in the housing transverse to the length of the cavity at the other end of the cavity, a second rotatable and translatable plug is disposed in the chamber, and the spring comprises a quartz rod that extends along the length of the second chamber, the rod having a deformed free end at the end of the cavity around which the middle of the wire is wrapped and an anchored end is attached to the second plug such that the middle of the hot wire wrapped around the free end of the rod is displaced from the axis of rotation of the second plug.

8. The apparatus of claim 7, in which the means for forming an entrance comprises a first conduit connected to the cavity at a point midway between its ends and the means for forming an exit comprises a second conduit connecting one end of the cavity to the outside of the housing and a third conduit connecting the other end of the cavity to the outside of the housing.

9. The apparatus of claim 8 in which the housing comprises a block of material having a first flat surface, a plate having a second flat surface adapted to abut the first surface, and means for attaching the plate to the block, and the cavity comprises a groove formed in the first surface of the block, the groove having an open side which is enclosed by the second surface of the plate.

10. The apparatus of claim 1, in which the second wire supporting means comprises a deformed rod around which the middle of the wire is wrapped, the deformed rod exerting tension on the hot wire to keep the hot wire taut as its length changes.

11. The apparatus of claim 10, in which an elongated chamber is formed in the housing transverse to the length of the cavity at the other end of the cavity, a rotatable and translatable plug is disposed in the chamber, and the rod extends along the length of the chamber, the rod having a deformed free end around which the middle of the wire is wrapped and an anchored end attached to the plug such that the middle of the hot wire wrapped around the free end of the rod is displaced from the axis of rotation of the plug.

12. The apparatus of claim 11, in which the free end of the rod has a hook to prevent the middle of the hot wire from slipping off the free end of the rod and to position the middle of the hot wire axially with respect to the rod.

13. The apparatus of claim 12, in which the rod is made of quartz.

14. The apparatus of claim 1, in which the means for forming an entrance comprises a first conduit connected to the cavity at a point midway between its ends and the means for forming an exit comprises a second conduit connecting one end of the cavity to the outside of the housing and a third conduit connecting the other end of the cavity to the outside of the housing.

15. The apparatus of claim 1, in which the cavity and the hot wire are horizontally oriented.

16. The apparatus of claim 1, in which the first supporting means rigidly supports the ends of the wire.

17. Fluid measuring apparatus comprising:
   a housing having an elongated cavity enclosed on its sides and open at its ends;
   a thin elongated, i.e., uncoiled, hot wire extending along the length of the cavity;
   first wire support means at one end of the cavity rotatable and translatable along a first axis transverse to the length of the cavity;
   second wire support means at the other end of the cavity rotatable and translatable about a second axis transverse to the length of the cavity;

first means displaced from the first axis for attaching the hot wire at one end of the cavity to the first wire support means;

second means displaced from the second axis for attaching the hot wire at the other end of the cavity to the second wire support means;

means for forming in the housing a fluid entrance to the cavity;

means for forming in the housing a fluid exit from the cavity longitudinally spaced from the fluid entrance; and means for measuring the change in resistance of the hot wire.

18. The apparatus of claim 17, in which the first wire support means comprises an elongated chamber transverse to the length of the cavity, a rotatable and translatable plug disposed in the chamber, and a printed circuit board having a conductive pad attached to the plug, and the first attaching means comprises a solder connection between the hot wire and the pad.

19. The apparatus of claim 18, in which the second wire support means comprises an elongated second chamber transverse to the length of the cavity at the other end of the cavity, a rotatable and translatable second plug disposed in the second chamber, and a rod having a deformed free end to which the hot wire is attached and an anchored end attached to the plug, the deformed free end of the rod exerting tension on the hot wire to keep the hot wire taut as its length changes.

20. The apparatus of claim 19, in which the hot wire is bent in half to extend along the length of the cavity such that the ends of the hot wire are attached to the first wire support means and the middle of the hot wire is wrapped around the rod, and the second attaching means comprises a hook at the free end of the rod.

21. The apparatus of claim 17, in which the second wire support means comprises an elongated chamber transverse to the length of the cavity at the other end of the cavity, a rotatable and translatable plug disposed in the chamber, and a rod having a deformed free end to which the hot wire is attached and an anchored end attached to the plug, the deformed free end of the rod exerting tension on the hot wire to keep the hot wire taut as its length changes.

22. The apparatus of claim 21, in which the hot wire is bent in half to extend along the length of the cavity such that the ends of the hot wire are attached to the first wire support means and the middle of the wire is wrapped around the rod, and the second attaching means comprises a hook formed near the free end of the rod.

23. Fluid measuring apparatus comprising:

a housing having an elongated cavity enclosed on its sides and open at its ends;

a thin elongated hot wire bent in half to extend along the length of the cavity;

a printed circuit board at one end of the cavity for supporting the ends of the hot wire;

first and second mutually isolated conductive pads on the circuit board;

solder connections between the ends of the hot wire and the first and second pads, respectively, to hold the ends of the hot wire in fixed relationship longitudinally and laterally and to electrically isolate the ends of the hot wire from each other;

a deformed spring at the other end of the cavity for supporting the middle of the wire, the deformed spring exerting tension on the middle of the hot wire to keep the hot wire taut as its length changes;

means for forming in the housing a fluid entrance to the cavity;

means for forming in the housing a fluid exit from the cavity longitudinally spaced from the entrance;

means for measuring the change in resistance of the hot wire; and a pair of electrical leads interconnected between the pads, respectively, and the measuring means.

* * * * *